United States Patent
Forouzan et al.

(10) Patent No.: US 10,673,093 B1
(45) Date of Patent: Jun. 2, 2020

(54) ELECTRIC VEHICLE LITHIUM BATTERIES HAVING NON-UNIFORM ANODE LAYER

(71) Applicant: SF MOTORS, INC., Santa Clara, CA (US)

(72) Inventors: Mehdi M. Forouzan, Santa Clara, CA (US); Saeed Khaleghi Rahimian, Santa Clara, CA (US); Sangwoo Han, Santa Clara, CA (US); Ying Liu, Santa Clara, CA (US); Yifan Tang, Santa Clara, CA (US)

(73) Assignees: CHONGQING JINKANG ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 0 days.

(21) Appl. No.: 16/212,262

(22) Filed: Dec. 6, 2018

(51) Int. Cl.
*H01M 4/64* (2006.01)
*H01M 10/0525* (2010.01)
*H01M 4/13* (2010.01)
*H01M 2/30* (2006.01)
*H01M 2/10* (2006.01)
*H01M 4/02* (2006.01)

(52) U.S. Cl.
CPC ..... *H01M 10/0525* (2013.01); *H01M 2/1077* (2013.01); *H01M 2/30* (2013.01); *H01M 4/13* (2013.01); *H01M 2004/021* (2013.01); *H01M 2004/027* (2013.01); *H01M 2220/20* (2013.01)

(58) Field of Classification Search
CPC .............. H01M 2004/021; H01M 4/366
See application file for complete search history.

(56) References Cited

U.S. PATENT DOCUMENTS

| | | |
|---|---|---|
| 2003/0118896 A1 | 6/2003 | Yamaguchi et al. |
| 2004/0053123 A1 | 3/2004 | Chang et al. |
| 2012/0328942 A1* | 12/2012 | Thomas-Alyea ..... H01M 4/587 429/211 |
| 2014/0287316 A1 | 9/2014 | Ahn et al. |
| 2015/0010798 A1 | 1/2015 | Sawai et al. |
| 2016/0190564 A1 | 6/2016 | Samarao et al. |

OTHER PUBLICATIONS

Forouzan, et al., "Modeling the effects of electrode microstructural heterogeneities on Li-ion battery performance and lifetime", J. Electrochem. Soc. 165(10): A2127-A2144 (2018).

(Continued)

*Primary Examiner* — Imran Akram
(74) *Attorney, Agent, or Firm* — Foley & Lardner LLP; James De Vellis

(57) ABSTRACT

Apparatuses, systems, and methods of storing electrical energy for electric vehicles are provided. A battery pack can be disposed in an electric vehicle to power the electric vehicle. A battery cell can be arranged in the battery pack. The battery cell can include a housing. The housing can define a cavity within the housing. The cavity of the battery cell can include a separator having a first side and a second side, a cathode disposed along the first side of the separator, and an anode disposed along the second side of the separator. The anode can include a first portion adjacent to the second side of the separator, and a second portion adjacent to the first portion and separated from the separator by the first portion. A porosity of the first portion of the anode can be greater than a porosity of the second portion of the anode.

20 Claims, 9 Drawing Sheets

(56) References Cited

OTHER PUBLICATIONS

Hein, et al., "Influence of local lithium metal deposition in 3D microstructures on local and global behavior of Lithium-ion batteries", Electrochimica Acta 201: 354-365 (2016).
Hendricks, et al., "A failure modes, mechanisms, and effects analysis (FMMEA) of lithium-ion batteries", Journal of Power Sources 297: 113-120 (2015).
Legrand, et al., "Physical characterization of the charging process of a Li-ion battery and prediction of Li plating by electrochemical modelling", Journal of Power Sources 245: 208-216 (2014).
Liu, et al ., "Understanding undesirable anode lithium plating issues in lithium-ion batteries", RSC Advances 6(91): 88683-88700 (2016).
Liu, et al, "Effects of electrolyte additives and solvents on unwanted lithium plating in lithium-ion cells", J. Electrochem. Soc. 164(6): A1173-A1183 (2017).
Petzl, et al., "Lithium plating in a commercial lithium-ion battery—A low-temperature aging study", Journal of Power Sources 275: 799-807 (2015).
Ren, et al., "Investigation of Lithium Plating-Stripping Process in Li-Ion Batteries at Low Temperature Using an Electrochemical Model", J. Electrochem. Soc. 165(10): A2167-A2178 (2018).
Shi, et al., "Robust solid/electrolyte interphase on graphite anode to suppress lithium inventory loss in lithium-ion batteries", Carbon 111: 291-298 (2017).
Uhlmann, et al., "In situ detection of lithium metal plating on graphite in experimental cells", Journal of Power Sources 279: 428-438 (2015).

Waldmann, et al., "Li plating as unwanted side reaction in commercial Li-ion cells—A review", Journal of Power Sources 384: 107-124 (2018).
Yang, et al., "A look into the voltage plateau signal for detection and quantification of lithium plating in lithium-ion cells", Journal of Power Sources 395: 251-261 (2018).
Yang, et al., "Modeling of lithium plating induced aging of lithium-ion batteries: Transition from linear to nonlinear aging", Journal of Power Sources 360: 28-40 (2017).
Barre, A.; Deguilhem, B.; Grolleau, S.; Gerard, M.; Suard, F.; Rui, D. "A Review on Lithium-ion Battery Ageing Mechanisms and Estimations for Automotive Applications" Journal of Power Sources 2013, 241, 680-689.
Birkl, C.R. et al. "A Degradation Diagnostics for Commerical Lithium-ion Cells Tested at -10 C" Electrochem. Soc. 2017, 164 (12) A2644-A2653.
Donaldson, L. "Making Fast-Charging Electric Vehicles a Possibility" Materials Today 2018, 21 (2) 105-106.
Fuller, T.F. et al. "Simulation and Optimization of the Dual Lithium Ion Insertion" Cell.J. Electrochem. Soc. 1994, 141 (1), 1-10.
Advisory Action on U.S. Appl. No. 16/234,251 dated Aug. 30, 2019 (4 pages).
Final Office Action on U.S. Appl. No. 16/234,251 dated Jun. 19, 2019 (9 pages).
Non-Final Office Action on U.S. Appl. No. 16/234,251 dated Feb. 15, 2019 (13 pages).
Non-Final Office Action on U.S. Appl. No. 16/234,251 dated Sep. 30, 2019 (9 pages).

* cited by examiner

ELECTRIC VEHICLE LITHIUM BATTERIES HAVING NON-UNIFORM ANODE LAYER

BACKGROUND

Batteries can include electrochemical cells to supply electrical power to various electrical components connected thereto. Such batteries can be installed in a vehicle (e.g., an automobile) to provide electrical energy to various electrical systems within the vehicle.

SUMMARY

The present disclosure is directed to batteries cells for battery packs in electrical vehicles. A battery cell can have a cathode electrically coupled to a positive terminal and an anode electrically coupled to a negative terminal. The cathode and anode can be separated from one another by a separator. To increase a lifetime of the battery cell by reducing an amount degradation of the cell due to the growth of a solid electrolyte interface and lithium plating, which can result in capacity fade, the present technical solution provides an anode with non-uniform porosity such that a first portion of the anode that is adjacent to the separator has a greater porosity than a second portion of the anode that is closer to the negative terminal or negative current collector. Such a formation of the anode can improve the operation of the battery cell by preventing lithium plating as well as enhancing electrical conductivity of the anode.

At least one aspect is directed to an apparatus to store electrical energy for electric vehicles. The apparatus can include a battery pack. The battery pack can be disposed in an electric vehicle to power the electric vehicle. The apparatus can include a battery cell. The battery cell can be arranged in the battery pack. The battery cell can have a housing. The housing can define a cavity within the housing of the battery cell. The battery cell can include a separator, a cathode, and an anode arranged or disposed within the cavity. The separator can have a first side and a second side, and can transfer ions between the first side and the second side. The cathode can be disposed along the first side of the separator, and can be electrically coupled with a positive terminal. The anode can be disposed within the cavity along the second side of the separator, and be separated from the cathode by the separator. The anode can be electrically coupled with the negative terminal. The anode can include a first portion and a second portion. The first portion of the anode can be adjacent to the second side of the separator, and the second portion of the anode can be adjacent to the first portion of the anode and separated from the separator by the first portion of the anode. A porosity of the first portion of the anode can be greater than a porosity of the second portion of the anode.

At least one aspect is directed to a system to store electrical energy for electric vehicles. The system can include a battery pack. The battery pack can be disposed in an electric vehicle to power the electric vehicle. The system can include a battery cell. The battery cell can be arranged in the battery pack. The battery cell can have a housing. The housing can define a cavity within the housing of the battery cell. The battery cell can include a separator, a cathode, and an anode arranged or disposed within the cavity. The separator can have a first side and a second side, and can transfer ions between the first side and the second side. The cathode can be disposed along the first side of the separator, and can be electrically coupled with a positive terminal. The anode can be disposed within the cavity along the second side of the separator, and be separated from the cathode by the separator. The anode can be electrically coupled with the negative terminal. The anode can include a first portion and a second portion. The first portion of the anode can be adjacent to the second side of the separator, and the second portion of the anode can be adjacent to the first portion of the anode and separated from the separator by the first portion of the anode. A porosity of the first portion of the anode can be greater than a porosity of the second portion of the anode.

At least one aspect is directed to a method of providing battery cells to power electric vehicles. The method can include disposing a battery pack in an electric vehicle to power the electric vehicle. The method can include arranging a housing for a battery cell in the battery pack. The housing can define a cavity within the housing for the battery cell. The method can include arranging, within the cavity of the battery cell, a separator having a first side and a second side. The separator can transfer ions between the first side and the second side. The method can include disposing, within the cavity of the battery cell, a cathode along the first side of the separator. The cathode can be electrically coupled with a positive terminal. The method can include disposing, within the cavity, an anode along the second side of the separator. The anode can be electrically coupled with the negative terminal. The anode can include a first portion and a second portion. The first portion of the anode can be adjacent to the second side of the separator, and the second portion of the anode can be adjacent to the first portion of the anode and separated from the separator by the first portion of the anode. A porosity of the first portion of the anode can be greater than a porosity of the second portion of the anode.

At least one aspect is directed to an electric vehicle. The electric vehicle can include one or more components. The electric vehicle can include a battery pack to power the one or more components. The electric vehicle can include a battery cell. The battery cell can be arranged in the battery pack. The battery cell can have a housing. The housing can define a cavity within the housing of the battery cell. The battery cell can include a separator, a cathode, and an anode arranged or disposed within the cavity. The separator can have a first side and a second side, and can transfer ions between the first side and the second side. The cathode can be disposed along the first side of the separator, and can be electrically coupled with a positive terminal. The anode can be disposed within the cavity along the second side of the separator, and be separated from the cathode by the separator. The anode can be electrically coupled with the negative terminal. The anode can include a first portion and a second portion. The first portion of the anode can be adjacent to the second side of the separator, and the second portion of the anode can be adjacent to the first portion of the anode and separated from the separator by the first portion of the anode. A porosity of the first portion of the anode can be greater than a porosity of the second portion of the anode.

At least one aspect is directed to a method. The method can include providing an apparatus. The apparatus can be included in an electric vehicle. The apparatus can include a battery pack. The battery pack can power the electric vehicle. The apparatus can include a battery cell. The battery cell can be arranged in the battery pack. The battery cell can have a housing. The housing can define a cavity within the housing of the battery cell. The battery cell can include a separator, a cathode, and an anode arranged or disposed within the cavity. The separator can have a first side and a second side, and can transfer ions between the first side and the second side. The cathode can be disposed along the first side of the separator, and can be electrically coupled with a positive terminal. The anode can be disposed within the cavity along the second side of the separator, and be separated from the cathode by the separator. The anode can be electrically coupled with the negative terminal. The anode can include a first portion and a second portion. The first portion of the anode can be adjacent to the second side of the separator, and the second portion of the anode can be adjacent to the first portion of the anode and separated from the separator by the first portion of the anode. A porosity of the first portion of the anode can be greater than a porosity of the second portion of the anode.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
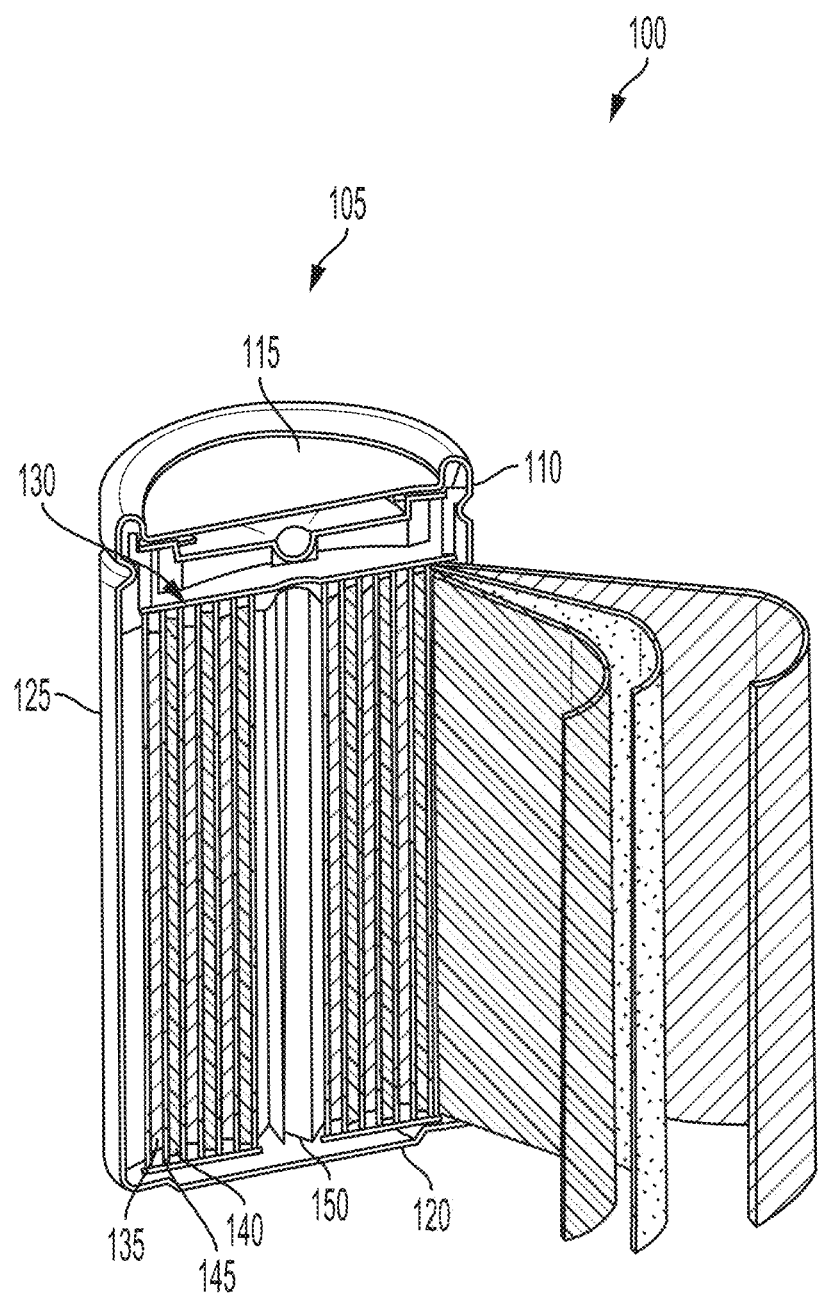
FIG. 1 is an isometric cross-sectional perspective of an example battery cell for powering electric vehicles.

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, hybrids, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

One type of battery cell that can be used in the electric vehicle can include lithium-ion based batteries. A membrane holding a liquid electrolyte (e.g., Lithium tetrafluoroborate ($LiBF_4$), Lithium hexafluorophosphate ($LiPF_6$), and Lithium perchlorate ($LiClO_4$)) dissolved in an organic solvent (e.g., dimethyl carbonate (DMC), ethylene carbonate (EC), or diethyl carbonate (DEC)) can be used in lithium-ion based batteries to transfer ions between the anode and the cathode. In some cases, a solid electrolyte (e.g., a solid polymer electrolyte, a ceramic electrolyte, or a glass electrolyte) can be used.

Li-ion batteries can be used for energy storage applications and to power EVs as well as personal electric devices such as computer laptops and cellphones due to high energy density, high operation voltage and low self-discharge. However, range per charge, charging time, cost, and lifetime are challenges for Li-ion cells, especially in electric vehicle applications in which long-term cycling and higher calendar life (10-15 years) are desired.

To increase the lifetime of a Li-ion cell, technical improvements to reduce degradation (aging) are provided. For example, growth of solid electrolyte interface (SEI) and lithium plating can cause degradation, causing capacity fade and increased internal resistance of the cell, resulting in a shorter lifetime for the battery. SEI can refer to a passivate layer forming on the surface of the active particles due to the unwanted reactions. Lithium plating can refer to a cathodic reaction where Li ions are reduced to metallic lithium on the surface of the anode active particles underneath the SEI layer. Part of the metallic lithium may be stripped during rest and discharge of the battery. Further, a portion, which can be referred to as dead lithium, may not be removed from the layer, which can provoke issues such as dendrite growth in addition to the cell capacity fade. Lithium plating and SEI growth can both result from parasitic (undesired) reactions in the negative electrode (e.g., anode). The rates of these reactions can depend on the cycling condition and design of the cell and increase with increasing the charging rate.

Thus, apparatus, systems and methods of the present technical solution can provide a battery cell capable of higher charging rate for use in EV technology, by mitigating the negative effects of the undesired reactions, thereby allowing for the battery to be charged faster with minimal damage. To allow for an increased rate of charging with a reduction in damage, the present technical solutions provides a lithium ion battery with an improved anode. The improved anode of the preset technical solution has a non-uniform porosity. For example, the battery cell can include an anode, cathode and a separator between the anode and the cathode. A layer or portion of the anode adjacent to the separator can have a greater porosity than a remaining porosity of the anode. By providing increased porosity in the portion of the anode near the separator, the anode can have a reduced internal resistance where lithium plating would occur. The porosity can be increased by moving part of the carbon additives from the part of the anode close separator towards the other part of the anode, thereby resulting in increased porosity in the anode near the separator. Increasing the porosity can decrease the tortuosity of the anode, thereby reducing the internal resistance. The porosity can be inversely proportional to the tortuosity.

FIG. 1, among others, depicts an isometric, cross-sectional view of a battery cell 105 for powering electric vehicles. The battery cell 105 can be part of a system or an apparatus 100 for powering components of electric vehicles. The battery cell 105 can be a solid-state lithium-ion battery cell to power electrical components (e.g., components of an electric vehicle). The battery cell 105 can include a housing 110. The housing 110 can be included in a battery module, a battery pack, or a battery array installed in an electric vehicle. The housing 110 can be of any shape. The shape of the housing 110 can be cylindrical with a circular (e.g., as depicted), elliptical, or ovular base, among others. The shape of the housing 110 can also be prismatic with a polygonal base, such as a triangle, a square, a rectangle, a pentagon, and a hexagon, among others. The housing 110 can have a length (or height) ranging between 65 mm to 125 mm. The housing 110 can have a width (or diameter in cylindrical examples as depicted) ranging between 18 mm to 45 mm. The housing 110 can have a thickness ranging between 100 mm to 200 mm.

The housing 110 of the battery cell 105 can include one or more materials with various electrical conductivity or thermal conductivity, or a combination thereof. The electrically conductive and thermally conductive material for the housing 110 of the battery cell 105 can include a metallic material, such as aluminum, an aluminum alloy with copper, silicon, tin, magnesium, manganese or zinc (e.g., of the aluminum 800, 4000, or 5000 series), iron, an iron-carbon alloy (e.g., steel), silver, nickel, copper, and a copper alloy, among others. The electrically insulative and thermally conductive material for the housing 110 of the battery cell 105 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The housing 110 of the battery cell 105 can have at least one lateral surface, such as a top surface 115 and a bottom surface 120. The top surface 115 can correspond to a top lateral side of the housing 110. The top surface 115 can be an integral portion of the housing 110. The top surface 115 can be separate from the housing 110, and added onto the top lateral side of the housing 110. The bottom surface 120 can correspond to a bottom lateral side of the housing 110, and can be on the opposite side of the top surface 115. The bottom surface 120 can correspond to a top lateral side of the housing 110. The bottom surface 120 can be an integral portion of the housing 110. The top surface 115 can be separate from the housing 110, and added onto the top lateral side of the housing 110. The housing 110 of the battery cell 105 can have at least one longitudinal surface, such as a sidewall 125. The sidewall 125 can extend between the top surface 115 and the bottom surface 120 of the housing 110. The sidewall 125 can have an indented portion (sometimes referred herein to as a neck or a crimped region) thereon. The top surface 115, the bottom surface 120, and the sidewall 125 can define a cavity 130 within the housing 110. The cavity 130 can correspond to an empty space, region, or volume within the housing 110 to hold content of the battery cell 105. The cavity 130 can span among the top surface 115, the bottom surface 120, and the sidewall 125 within the housing 110.

The battery cell 105 can include a cathode layer 135 (sometimes herein generally referred to as a cathode). The cathode layer 135 can be situated, arranged, or otherwise disposed within the cavity 130 defined by the housing 110. At least a portion of the cathode layer 135 can be in contact or flush within an inner side of the side wall 125. At least a portion of the cathode layer 135 can be in contact or flush with an inner side of the bottom surface 120. The cathode layer 135 can output conventional electrical current out from the battery cell 105 and can receive electrons during the operation of the battery cell 105. The cathode layer 135 can also release lithium ions during the operation of the battery cell 105. As the battery cell 105 can be a solid-state lithium-ion battery, the cathode layer 135 can be comprised of a solid cathode material, such as a lithium-based oxide materials or phosphates. The cathode layer 135 can be comprised of Lithium Cobalt Oxide ($LiCoO_2$), Lithium Iron Phosphate ($LiFePO_4$), Lithium Manganese Oxide ($LiMn_2O_4$), Lithium Nickel Manganese Cobalt Oxide ($LiNi_xMn_yCo_zO_2$), Lithium Nickel Cobalt Aluminum Oxide ($LiNiCoAlO_2$), among other lithium-based materials. The cathode layer 135 can have a length (or height) ranging between 50 mm to 120 mm. The cathode layer 135 can have a width ranging between 50 mm to 2000 mm. The cathode layer 135 can have a thickness ranging between 50 μm to 200 μm.

The battery cell 105 can include at least one anode layer 140 (sometimes herein generally referred to as an anode). The anode layer 140 can be situated, arranged, or otherwise disposed within the cavity 130 defined by the housing 110. At least a portion of the anode layer 140 can be in contact or flush within an inner side of the side wall 125. At least a portion of the anode layer 140 can be in contact or flush with an inner side of the bottom surface 120. The anode layer 140 can receive conventional electrical current into the battery cell 105 and output electrons during the operation of the battery cell 105 (e.g., charging or discharging of the battery cell 105). With the battery cell 105 being a solid-state lithium-ion battery, the anode layer 140 can be comprised of a solid anode material. The anode layer 140 can be initially free of lithium material prior to the first charging cycle of the battery cell 105. The anode layer 140 can have a length (or height) ranging between 50 mm to 120 mm. The anode layer 140 can have a width ranging between 50 mm to 2000 mm. The anode layer 140 can have a thickness ranging between 15 μm to 200 μm.

The battery cell 105 can include an electrolyte material 145 (or a solid electrolyte). The electrolyte material 145 can be situated, disposed, or otherwise arranged within the cavity 130 defined by the housing 110. At least a portion of the electrolyte material 145 can be in contact or flush within an inner side of the side wall 125. At least a portion of the electrolyte material 145 can be in contact or flush with an inner side of the bottom surface 120. The electrolyte material 145 can be arranged between the anode layer 140 and the cathode layer 135 to separate the anode layer 140 and the cathode layer 135. The electrolyte material 145 can transfer ions between the anode layer 140 and the cathode layer 135. The electrolyte material 145 can transfer cations from the anode layer 140 to the cathode layer (or vica versa) 135 during the operation of the battery cell 105.

With the battery cell 105 being a lithium-ion battery, the electrolyte material 145 can include any type of electrolyte material, including a solid material, liquid material, or semi-solid material. The electrolyte material 145 can be comprised of $LiPF_6$ in a solution, a ceramic electrolyte material, such as Lithium Phosphorous Oxy-Nitride ($Li_xPO_yN_z$), Lithium Germanium Phosphate Sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., Strontium titanate ($SrTiO_3$)), among others. The electrolyte material 145 can be comprised of a polymer electrolyte material, such as polyacrylonitrile (PAN), polyethylene oxide (PEO), polymethylmethacrylate (PMMA), and polyvinylidene fluoride (PVDF), among others. The electrolyte material 145 can be comprised of a glassy electrolyte material, such as Lithium Sulfide-Phosphor Pentasulfide ($Li_2S$—$P_2S_5$), Lithium Sulfide-Boron Sulfide ($Li_2S$—$B_2S_3$), and Tin Sulfide-Phosphor Pentasulfide ($SnS$—$P_2S_5$). The electrolyte material 145 can include any combination of the ceramic electrolyte material, the polymer electrolyte material, and the glassy electrolyte material, among others. The electrolyte material 145 can be in a cavity or housing having a length (or height) ranging between 50 mm to 120 mm. The electrolyte material 145 can be in a cavity or housing having a width ranging between 50 mm to 2000 mm. The electrolyte material 145 can have a thickness ranging between 10 µm to 100 µm. The electrolyte material 145 can be a liquid or a solid material.

The battery cell 105 can include at least one center support 150. The center support 150 can be situated, arranged, or disposed within the cavity 130 defined by the housing 130. At least a portion of the center support 150 can be in contact or flush within an inner side of the side wall 125. At least a portion of the center support 150 can be in contact or flush with an inner side of the bottom surface 120. The center support 150 can be positioned in a hollowing defined by the anode layer 140, the cathode layer 135, or the electrolyte material 145. The center support 150 in the hollowing can be any structure or member to wrap around the anode layers 135, the cathode layers 140, and the electrolyte material 145 in stack formation. The center support 150 can include an electrically insulative material, and the center support 150 can function neither as the positive terminal nor the negative terminal for the battery cell 105. The battery cell 105 can also lack or not include the center support 150.

Figure 2:
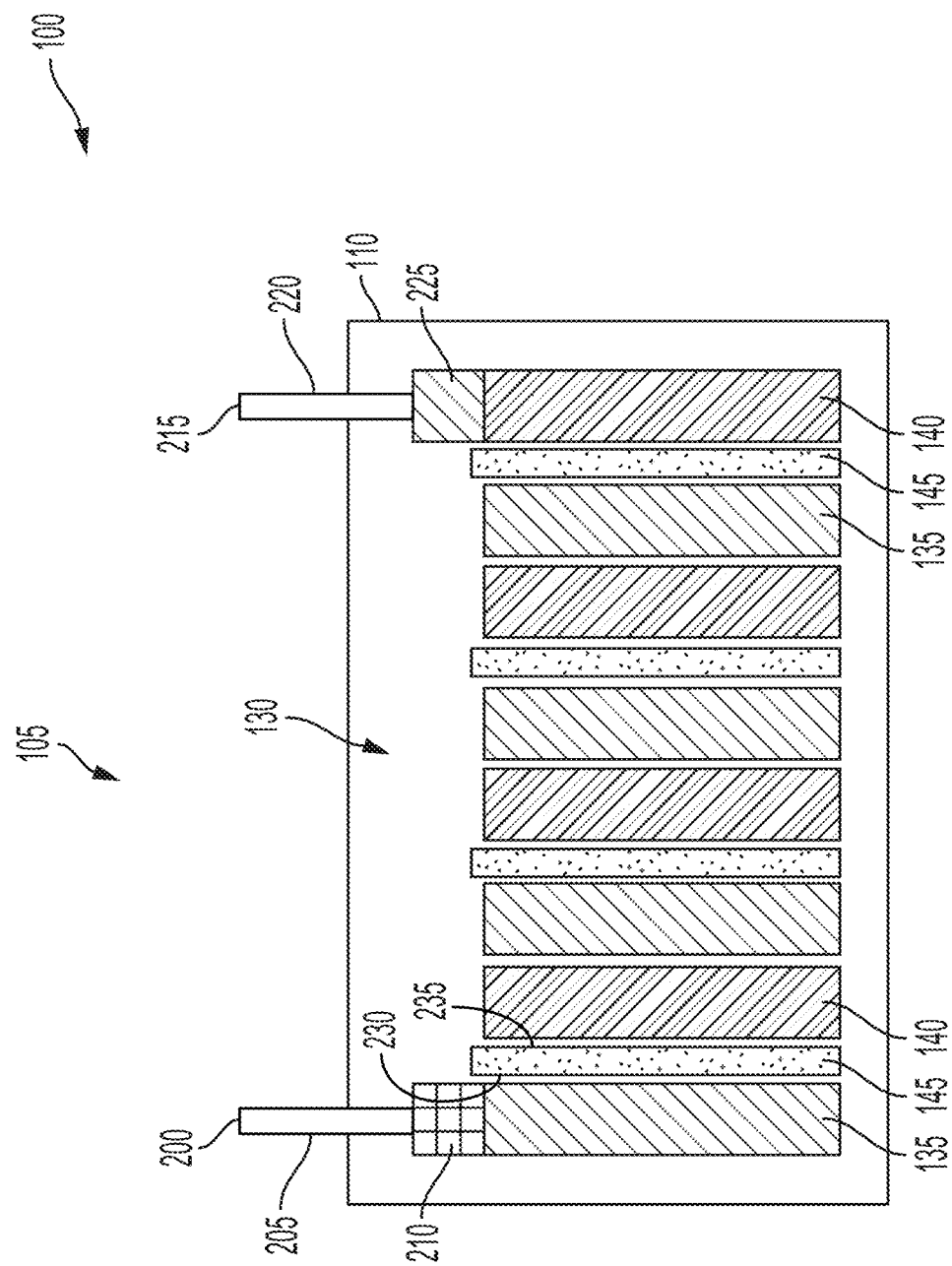
FIG. 2 is a cross-sectional block diagram of an example battery cell for powering electric vehicles.

FIG. 2, among others, depicts a cross-sectional view of the battery cell 105 for powering electric vehicles. As depicted, the battery cell 105 can include at least one positive terminal 200. The positive terminal 200 can correspond to an end at which conventional electrical current can be outputted from the battery cell 105 and electrons can be received during the operation of the battery cell 105 (e.g., charging or discharging of the battery cell 105). The positive terminal 200 can be defined anywhere on the housing 110, such as the top surface 115, the bottom surface 120, and the sidewall 125. For example, the positive terminal 200 can be defined along the top surface 115 of the housing 110. The positive terminal 200 can correspond to at least a portion of the top surface 115 of the housing 110. The positive terminal 200 can be electrically coupled with at least a portion of the top surface 115 of the housing 110. The positive terminal 200 can be electrically coupled with the cathode layer 135 disposed in the cavity 130 of the housing 110.

The battery cell 105 can include at least one positive bonding element 205. The positive bonding element 205 can correspond to an electrically conductive wire. The electrically conductive material for the positive bonding element 205 can include a metallic material, such as aluminum, an aluminum alloy with copper, silicon, tin, magnesium, manganese or zinc (e.g., of the aluminum 800, 4000, or 5000 series), iron, an iron-carbon alloy (e.g., steel), silver, nickel, copper, and a copper alloy, among others. The positive bonding element 205 can extend partially within the cavity 130 defined by the housing 110. The positive bonding element 205 can correspond to the positive terminal 200 of the battery cell 105. The positive bonding element 205 can be electrically couple with the cathode layer 135 disposed in the cavity 130 of the housing 110 with the positive terminal 200 to carry conventional electrical current to the cathode layer 135.

The battery cell 105 can include at least one positive contact 210. The positive contact 210 can be disposed or arranged on one end of the cathode layer 135 disposed within the cavity 130 of the housing 110. The positive contact 210 can be at least partially in physical contact with a portion (e.g., a top end as depicted or along a longitudinal side) of the cathode layer 135. The positive contact 210 can electrical couple the positive bonding element 205 to the cathode layer 135 disposed within the cavity 130 of the housing 110. The positive contact 210 can be attached, welded, bonded, or otherwise joined to the positive bonding element 205. The positive contact 210 can carry conventional electrical current into the cathode layer 135 during operation of the battery cell 105. The electrically conductive material of the positive contact 210 can include a metallic material, such as aluminum, an aluminum alloy with copper, silicon, tin, magnesium, manganese or zinc (e.g., of the aluminum 800, 4000, or 5000 series), iron, an iron-carbon alloy (e.g., steel), silver, nickel, copper, and a copper alloy, among others.

The battery cell 105 can include at least one negative terminal 215. The negative terminal 215 can correspond to an end at which conventional electrical current can be received into the battery cell 105 and electrons can be released during the operation of the battery cell 105. The negative terminal 215 can be defined anywhere on the housing 110, such as the top surface 115, the bottom surface 120, and the sidewalls 125. For example, the negative terminal 215 can be defined along the sidewall 125 of the housing 110. The negative terminal 215 can correspond to at least a portion of the sidewall 125 of the housing 110. The negative terminal 215 can be electrically coupled with at least a portion of the sidewall 125 of the housing 110. The negative terminal 215 can be electrically coupled with the anode layer 140 disposed in the cavity 130 of the housing 110.

The battery cell 105 can include at least one negative bonding element 220. The negative bonding element 220 can correspond to an electrically conductive wire. The electrically conductive material for the negative bonding element 220 can include a metallic material, such as aluminum, an aluminum alloy with copper, silicon, tin, magnesium, manganese or zinc (e.g., of the aluminum 800, 4000, or 5000 series), iron, an iron-carbon alloy (e.g., steel), silver, nickel, copper, and a copper alloy, among others. The negative bonding element 220 can extend partially within the cavity 130 defined by the housing 110. The negative bonding element 220 can correspond to the negative terminal 215 of the battery cell 105. The negative bonding element 220 can electrically couple the anode layer 140 disposed in the cavity 130 of the housing 110 with the negative terminal 215 to carry conventional electrical current out of the anode layer 140.

The battery cell 105 can include at least one negative contact 225. The negative contact 225 can be disposed or arranged on one end of the anode layer 140 disposed within the cavity 130 of the housing 110. The negative contact 225 can be at least partially in physical contact with a portion (e.g., a top end as depicted or along a longitudinal side) of the anode layer 140. The negative contact 225 can electrical couple the negative bonding element 220 to the anode layer 140 disposed within the cavity 130 of the housing 110. The negative contact 225 can be attached, welded, bonded, or otherwise joined to the negative bonding element 220. The negative contact 225 can carry conventional electrical current out of the anode layer 140 during operation of the battery cell 105. The electrically conductive material of the negative contact 225 can include a metallic material, such as aluminum, an aluminum alloy with copper, silicon, tin, magnesium, manganese or zinc (e.g., of the aluminum 800, 4000, or 5000 series), iron, an iron-carbon alloy (e.g., steel), silver, nickel, copper, and a copper alloy, among others.

The battery cell 105 can have a set of cathode layers 135, a set of anode layers 140, and a set of electrolyte material 145 arranged within the cavity 130 of the housing 110. The set of cathode layers 135, the set of anode layers 140, and the electrolyte material 145 can be arranged in succession, stacked, or interleaved. At least one of the electrolyte material 145 can separate one of the cathode layers 135 and one of the anode layers 140. At least one of the cathode layers 135 and at least one of the anode layers 140 can be separated without an electrolyte material 145 between the cathode layer 135 and the anode layer 140. At least one of the cathode layers 135 and at least one of the anode layers 140 can be adjacent with each other. The set of cathode layers 135 and the set of anode layers 140 can be electrically coupled with one another in succession. Each cathode layer 135 can be electrically coupled with one of the anode layers 140. Each anode layer 140 can be electrically coupled with one of the cathode layers 135. Each cathode layer 135, each anode layer 140, each electrolyte material 145 can be arranged longitudinally within the cavity 130. Each cathode layer 135, each anode layer 140, and each electrolyte material 145 can at least partially extend from the bottom surface 120 to the top surface 115. Each cathode layer 135, each anode layer 140, each electrolyte material 145 can be arranged laterally within the cavity 130. Each cathode layer 135, each anode layer 140, and each electrolyte material 145 can at least partially extend from one side wall 125 to another side wall 125.

The electrolyte material 145 can include at least one first side 230. The first side 230 can correspond to one surface of the electrolyte material 145. The first side 230 can correspond to the surface facing the cathode layer 135. The cathode layer 135 can be disposed within the cavity 130 at least partially along the first side 230 of the electrolyte material 145. At least one side of the cathode layer 135 can be in contact or flush with at least a portion of the first side 230 of the electrolyte material 145. The cathode layer 135 can be electrically coupled with the electrolyte material 145 through the first side 230. During operation of the battery cell 105 (e.g., charging or discharging), the cathode layer 135 can release lithium material into the electrolyte material 145 through the first side 230. The lithium material released by the cathode layer 135 can move as cations through the electrolyte material 145 and toward the anode layer 140 on the other side of the electrolyte material 145.

The electrolyte material 145 can include at least one second side 235. The second side 235 can correspond to another surface of the electrolyte material 145. The second side 235 can correspond to the surface facing the anode layer 140. The anode layer 140 can be disposed within the cavity 130 at least partially along the second side 235 of the electrolyte material 145. At least one side of the anode layer 140 can be in contact or flush with at least a portion of the second side 235 of the electrolyte material 145. The anode layer 140 can be electrically coupled with the electrolyte material 145 through the second side 235. During operation of the battery cell 105, the anode layer 140 can receive the lithium material conveyed through the electrolyte material 145 via the second side 235. If the anode layer 140 were to comprise of graphite or lithium material, the lithium material can collect within the anode layer 140. As more and more lithium material is collected with repeated operation of the battery cell 105, the anode layer 140 can undergo the dendritic growth of the lithium material. The dendrite formation of the lithium material from the anode layer 140 can eventually pierce through the electrolyte material 145 and reach the cathode layer 135, leading to short-circuiting of the battery cell 105.

Prior to the first use (e.g., initial charging cycle) of the battery cell 105, the anode layer 140 of the battery cell 105 may not be pre-doped with lithium material. The anode layer 140 can be initially free of lithium material prior to the first charging cycle of the battery cell 105. The anode layer 140 can be substantially free (e.g., less than 5%) of any lithium material before the first charging cycle of the battery cell 105. Instead, the lithium material can initially reside within the cathode layer 135 of the battery cell 105 prior to the first charging cycle of the battery cell 105. The lithium material can also initially reside within the electrolyte material 145 of the battery cell 105 before the first charging cycle of the battery cell 105.

During operation of the battery cell 105 (e.g., charging or discharging), the lithium material can be transferred through the first surface 230 of the electrolyte material 145 from the cathode layer 135. The lithium material originally within the electrolyte material 145 can also move toward the second surface 235 toward the anode layer 140 during the operation of the battery cell 105. The anode layer 140 can receive the lithium material transferred through the electrolyte material 145 via the second surface 235.

Figure 3:
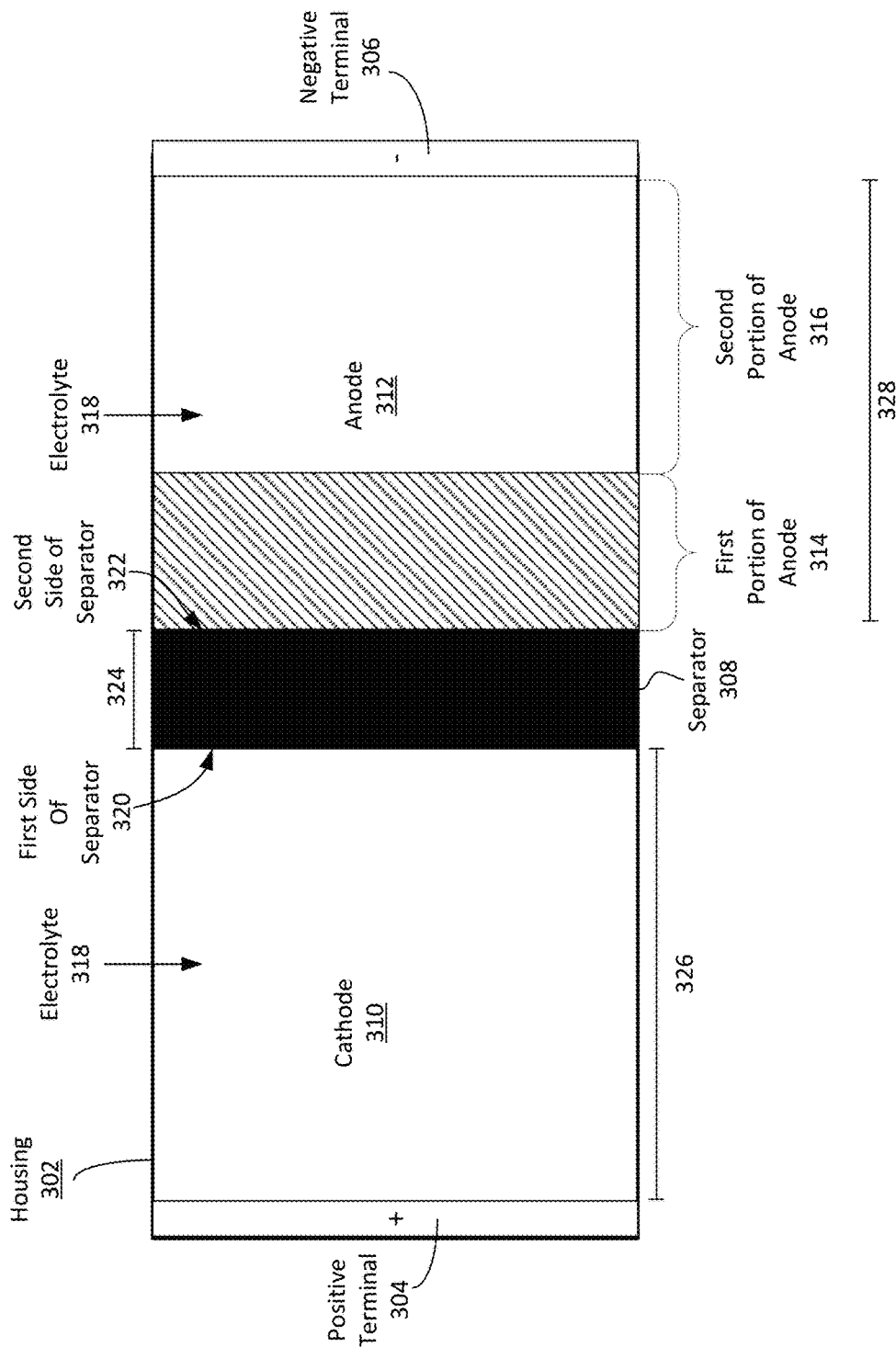
FIG. 3 is a block diagram of an example battery cell with an anode having a non-uniform porosity.

FIG. 3 depicts a block diagram of an example battery cell with an anode having a non-uniform porosity. By increasing the porosity of a portion of the anode (e.g., portion 314) closer to the separator (e.g., 308) or cathode (e.g., 310), the present technical solution can mitigate the negative effects of the undesired reactions (e.g. lithium plating), thereby allowing for the battery to be charged faster with less degradation.

The present technical solution provides an improved battery cell design (e.g., battery cell 105 having an improved anode 312 or negative electrode) that reduces or minimizes the cell degradation by diminishing lithium plating under fast charge conditions. For example, the lithium plating may be deposited within 30% of the negative electrode thickness close to the separator. A higher internal resistance may significantly increase the lithium plating rate. Based on these factors, multiple design parameters such as thickness of the electrodes and separator, porosity of the negative electrode, tortuosity of the negative electrode, different sizes of the negative electrode active particles can be determined to impact lithium plating rate. To reduce the lithium plating rate relative to a uniform porosity anode, the present technical solution provides a hierarchical structure or a two-step coating-drying where higher porosity is provided close to the separator and more filler is located close to the negative electrode current collector to reduce the amount of lithium deposition during fast charging. This non-uniform porosity anode structure can improve the voltage at higher discharge rates due to improved ionic transport close to the separator where the maximum ionic current flows, and improve electronic transport close to the negative electrode current collector where the maximum electronic current flows.

To determine the amount and location of Li plating in the anode, a battery modeling system can be used to develop an electrochemical model developed with a finite element based software. The battery modeling system can solve partial differential equations representing charge and diffusion material balances in solid and electrolyte phases. The battery modeling system can couple the lumped heat balance of the cell with other equations to predict the average temperature of the cell. The electrochemical reactions take place on the surface of the active particles represented by the Butler-Volmer equation. Lithium plating can be considered as an electrochemical reaction with an equilibrium potential of zero. When the lithium plating starts (e.g. at high state of charge during charge) there can be a competition between lithium plating and intercalation currents evaluated by the model and can be changed with different model parameter sets.

The battery modeling system can determine the cycling behavior of a battery under different conditions. The relationship between different operation and design parameters and the performance of the cell can facilitate cell design, development, and optimization. For example, the model can be used to optimize the design of the cell for maximum power for particular purposes where power cells are used (such as hybrid EVs) and energy where energy cells are used (such as EVs). The battery modeling system can take into account degradation when optimizing the cell. For example, the battery modeling system can take into account lithium plating as a factor along with other factors during cell design. Thus, the battery modeling system can optimize the design to minimize lithium plating at higher charging rates.

Since it can be challenging to study lithium plating via experiments, it may be difficult to monitor the locations in the negative electrode where lithium ions may plate, gather, or accumulate. Furthermore, it can be challenging to measure the amount of plated lithium under different charging conditions. The battery modeling system used for the present technical solution can associate a voltage plateau signal (e.g., a mixed potential) during relaxation and discharge of a charged cell with stripping of the metallic lithium plated during charge. The battery modeling system can use mathematical models to predict cycling behavior and the amount of lithium metal at different locations of the negative electrode (e.g., anode) under different charging conditions. This prediction assists with cell design optimization for minimized Li plating and degradation in a more accurate, systematic, and less costly manner. The Li-plating computational study is essential for cell design and optimization, resulting in longer longevity. Thus, the battery modeling system of the present technical solution can estimate, determine, predict or otherwise identify the amount of lithium plated. The battery modeling system can efficiently use an electrochemical-thermal model to determine the effects of the design parameters on the amount of plated lithium during fast charging at room temperature. The battery modeling system can identify, determine or select the optimized battery design that mitigates or reduces the lithium plating rate. The battery design that minimizes or reduces the lithium plating rate can be used to optimize the design parameters of the battery to prolong the cell life by minimizing the lithium plating under the fast charge condition.

The battery cell 105 depicted in FIG. 3 can be used in conjunction with one or more of FIG. 1, 2, or 4-9 depicted herein. Battery cell 105 can be referred to as a non-uniform porosity battery cell, or hierarchical anode battery cell, or two-portioned anode battery cell. The battery cell 105 can include one or more component or functionality of battery cell 105 depicted in FIG. 1. For example, apparatus 100 can include battery cell 105. The apparatus 100 can include one or more battery modules 500 depicted in FIG. 5 or one or more battery packs 705 depicted in FIG. 7. Battery cell 105 can include a housing 302. The housing 302 can include one or more component or functionality of housing 110 depicted in FIG. 1. The battery cell 105 can include a separator 308, a cathode 310, and an anode 312. The cathode 310 can include one or more component or functionality of cathode 135. The anode 312 can include one or more component or functionality of anode 140. The cathode 310 can be electrically coupled with a positive terminal 304. The positive terminal 304 can include one or more component or functionality of positive terminal 200. The anode 312 can be electrically coupled with a negative terminal 306. The negative terminal 306 can include one or more component or functionality of negative terminal 215.

The housing 302 can define a cavity, such as a cavity 130 depicted in FIG. 1. An electrolyte 318 can be provided in the cavity defined by the housing 302. The electrolyte 318 can include one or more component of functionality of electrolyte material 145 or electrolyte material 145. The separator 308 can be arranged in the cavity formed by the housing 302 between the cathode 310 and the anode 312. The cathode 310 and anode 312 can be separated by a separator 308. The separator 308 can include a permeable membrane. The separator 308 can include or be formed from the electrolyte material 145 or electrolyte 318. The electrolyte 318 can be provided between the cathode 310 and anode 140. The separator can keep the cathode 310 and anode 312 apart to prevent electrical short circuits, while also allowing the transport of ionic charge carriers.

The separator 308 can have a first side 320 (e.g., first side 230) that is located adjacent to the cathode 310. The separator 308 can have a second side 322 (e.g., second side 235) that is located adjacent to the anode 312. The separator 308 can be formed from any material that is configured to transfer ions between the cathode 310 and the anode 312 via the first side 320 and the second side 322. The separator 308 can have a width or thickness 324. The thickness 324 of the separator can be designed or selected to facilitate the energy density and power density of the battery. The thickness 324 can range, for example, from 25 micrometers to 1 millimeter. The separator 308 can be permeable and the pore size can range from 30 to 100 nano-meters (nm). The porosity of the separator 308 can range from 30 to 50%. For example, the separator 308 can include polyolefin, which can refer to a class of polymer that is produced from olefin by polymerizing olefin ethylene. Ethylene can come from a petrochemical source. Polyolefin can be made from polyethylene, polypropylene or laminates of both materials.

The anode 312 can include one or more portions. For example, the anode 312 can include a first portion 314 that is adjacent to the second side 322 of the separator 308. The anode 312 can include a second portion 316 that is not adjacent to the separator 308. The first portion 314 can separate the second portion 316 from the separator 308. The second portion 316 can be adjacent to the negative terminal 306. The second portion 316 can be further from the separator 308 than the first portion 314. The second portion 316 can be closer to the negative terminal 306 as compared to the first portion 314.

The first portion 314 and the second portion 316 of the anode can be formed of similar materials or different materials. The first portion 314 can have a different porosity as compared to the second portion 316. The anode 312 can include a hierarchical structure that includes the first portion 314 of the anode 312 and the second portion 316 of the anode 312. To reduce the rate of lithium plating, the first portion 314 can have a greater porosity as compared to the second portion 316. For example, a baseline or uniform porosity for the anode 312 may be 20% or 25%. However, for a non-uniform porosity anode 312, the porosity of the portion 314 near the separator 308 can be increased to 30%, and the porosity of the second portion 316 of the anode 312 near the negative terminal 306 can be lowered to 18%. For example, a baseline uniform porosity across the entire anode 312 may be 20%, whereas the improved anode 312 of the present technical solution can have a porosity that ranges from 30% to 18% from the portion 314 closer to the separator to the portion 316 closer to the negative terminal 306. A porosity of a first portion 314 of the anode 312 closer to the separator 308 can be increased by an amount relative to the baseline porosity of the anode 312. One or more techniques, systems or processes can be used to determine the porosity. For example, a model or battery modeling system configured with mathematical models or other models of battery cells can be used to determine porosity levels for the anode. The porosity of the first portion 314 of the anode 312 can be predetermined based on a model (e.g., by the battery modelling system), factors or multiple design parameters such as thickness of the electrodes and separator, porosity of the negative electrode, tortuosity of the negative electrode, different sizes of the negative electrode active particles can be determined to impact lithium plating rate. The input to the model or battery modelling system can include a current amount or a rate of charge. An output of the model or battery modeling system can include at least one of a lithium plating amount, a lithium plating location in the anode, an amount of heat generation, or an average temperature of the cell. The parameters used in the model can include, for example, a thickness 324 of the separator 308, a thickness 328 of the anode 312, a thickness 326 of the cathode 310, types of materials used in the battery cell 105, or other parameters associated with the battery cell 105 or associated with desired use cases or usage patterns of the battery cell 105 (e.g., charge rate, discharge rate, current, or voltage). Based on these factors, design parameters, or a model, the thickness of the first portion and porosity of the first portion can be determined.

For example, the porosity of the first portion 314 of the anode 312 can be set, designed, determined or established based on a thickness 328 of the anode 312 to manage an amount of lithium plating on the second side 322 of the separator 308. The porosity of the first portion 314 of the anode 312 can be set, designed, determined or established based on a thickness 324 of the separator 308 to manage an amount of lithium plating on the second side 322 of the separator 308. The porosity of the first portion 314 of the anode 312 can be set, designed, determined or established based on a thickness 326 of the cathode 310 to manage an amount of lithium plating on the second side 322 of the separator 308. The battery modeling system can take into account one or more of thicknesses 324, 326 or 328 to set the porosity of the first portion. The porosity of the first portion 314 can change as a function of the thickness 328 of the anode 312 (e.g., thickness 328 of anode may be 70 micrometers in an EV cell or 20 to 30 micrometers in a hybrid power cell).

The porosity of the first portion 314 can be set as an absolute value, such as 15 to 30% or more. The porosity of the first portion 314 can be set relative to the porosity of the second portion 316. The porosity of the first portion 314 of the anode 312 can be greater than the porosity of the second portion 316 by a predetermined threshold, such as 10% greater, 15%, 20% greater, 30% greater or more than the porosity of the second portion 316. The porosity of the first portion 314 of the anode 312 can be greater than the porosity of the second portion 316 by an amount within a predetermined range, such as 18% to 30%. The porosity at regions of the anode 312 that are more susceptible to lithium plating can be increased, which can reduce the rate or amount of lithium plating at those regions of the anode 312.

The thickness of the first portion 314 and the thickness of the second portion 316 can be predetermined. The battery modelling system, using a model, can determine an optimal design for the battery cell that includes a thickness for the first portion 314 and a thickness for the second portion 316 of the anode 312. The thickness of the first portion 314 can be less than a thickness of the second portion 316, while the porosity of the first portion 314 can be greater than a porosity of the second portion 316. For example, the thickness of the first portion 314 can be 25 microns, 26 microns, 27 microns, 28 microns, 30 microns, 32 microns or micrometers, or less, while the porosity of the first portion 314 can be 20% greater than the porosity of the second portion 316. The thickness of the first portion 314 can be less than a predetermined percentage (e.g., 20%, 30%, 40%, 50% or some other percentage) of the thickness 328 of the anode 312 or thickness of the second portion 316. For example, the thickness of the first portion 314 can be 30% the thickness 328 of the anode.

Figure 4:
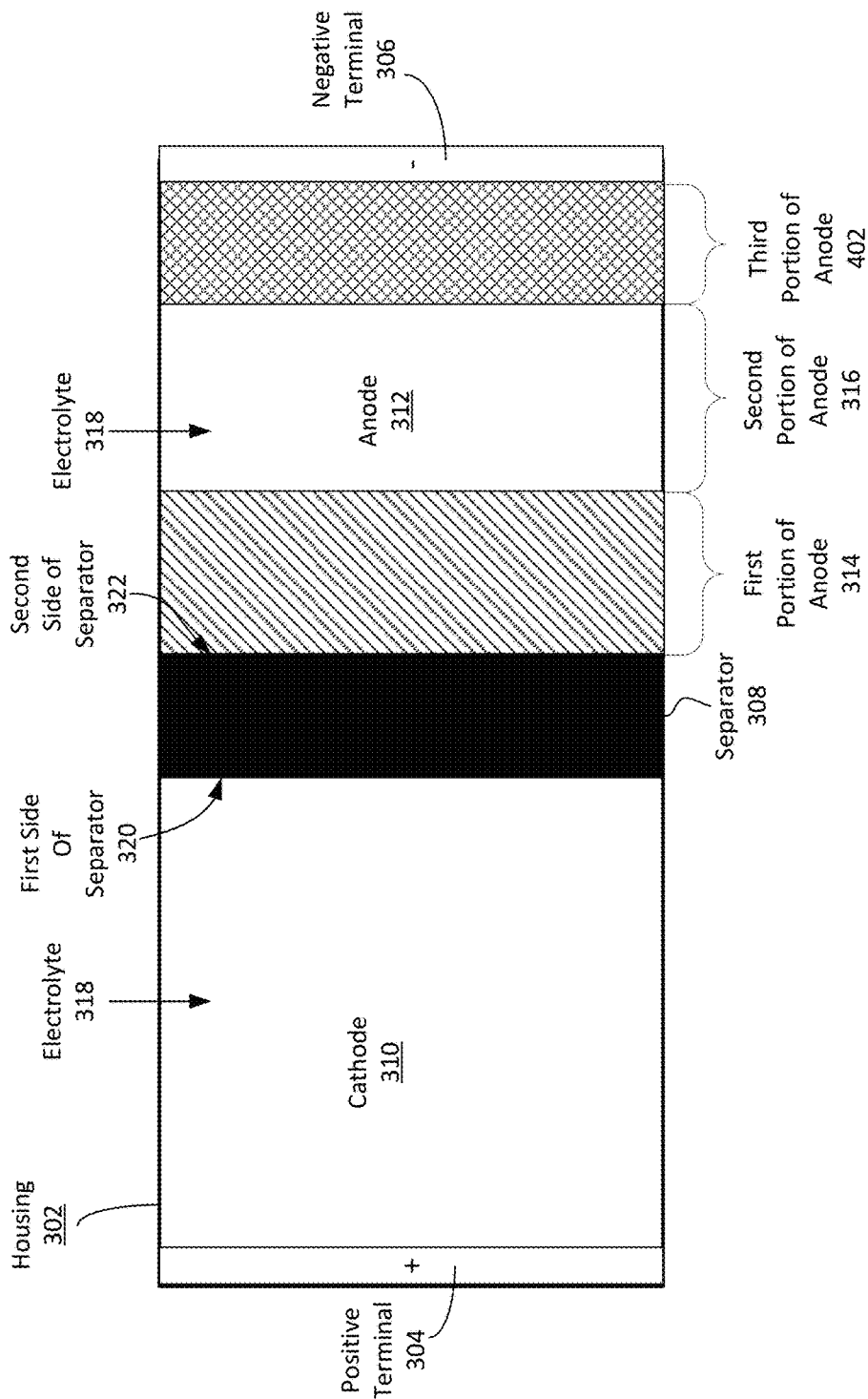
FIG. 4 is a block diagram of an example battery cell with an anode having a non-uniform porosity.

FIG. 4 depicts a block diagram of an example battery cell with an anode having a non-uniform porosity. The battery cell 105 can include one or more component or functionality depicted in FIGS. 1-3 and 5-9. Battery cell 105 can be referred to as a three portioned anode battery cell or multi-portioned anode battery cell. For example, the battery cell 105 can include one or more component or functionality of battery cell 105 depicted in FIG. 3. The battery cell 105 can include a cathode 310 separated from an anode 312 by a separator 308. The anode 312 can include multiple portions. The anode 312 can include 2 portions, 3 portions, 4 portions or more. For example, the anode 312 of the battery cell 105 can include a first portion 314, second portion 316, and a third portion 402. Each of the portions of the anode 312 can have a same or different thickness and porosity. For example, the thickness of the first portion 314 can be different from the thickness of the second portion 316 or the third portion 402. The thickness of the second portion 316 can be different from the thickness of the third portion 402.

The thickness of the first portion 314 can be greater than the thickness of the second portion 316. The thickness of the first portion 314 can be greater than the thickness of the third portion 402. However, the thickness of the first portion 314 can be less than the combined thickness of the second portion 316 and the third portion 402. For example, the thickness of the first portion 314 can be 40% the thickness of the anode 312, and the combined thickness of the second portion 316 and the third portion 402 can be 60% of the thickness of the anode 312.

The thickness of the first portion 314 can be less than the thickness of at least one of the second portion 316 or third portion 402. The thickness of the first portion 314 can be less than the thickness of each of the second portion 316 and third portion 402. For example, the thickness of the first portion 314 can be 30% the thickness of the anode 312, and the thickness of each of the second portion 316 and third portion 402 can be 35% of the thickness of the anode 312.

The porosity of the first portion 314, second portion 316 and third portion 402 can each be different. The porosity of the first portion 314 can be different from the porosity of at least one of the second portion 316 or third portion 402. The porosity of the second portion 316 can be the same as the porosity of the third portion 402. The porosity of the first portion 314 can be greater than the porosity of the second portion 316, and the porosity of the second portion can be greater than the porosity of the third portion 402, such that the porosity of the third portion 402 is also less than that the porosity of the first portion 314. The porosity of the first portion 314 of the anode can be greater than the anode and cathode currect collectors or terminals 306 and 304.

For example, the porosity of the first portion 314 can be 30%, the porosity of the second portion 316 can be 24%, and the porosity of the third portion 402 can be 18%. The porosity from the first portion 314 to the third portion 402 can range from 30% to 18%, respectively; 30% to 15%, respectively; 35% to 18%, respectively; 35% to 15% respectively; 40% to 18%, respectively; 40% to 15% respectively, or some other range.

Figure 5:
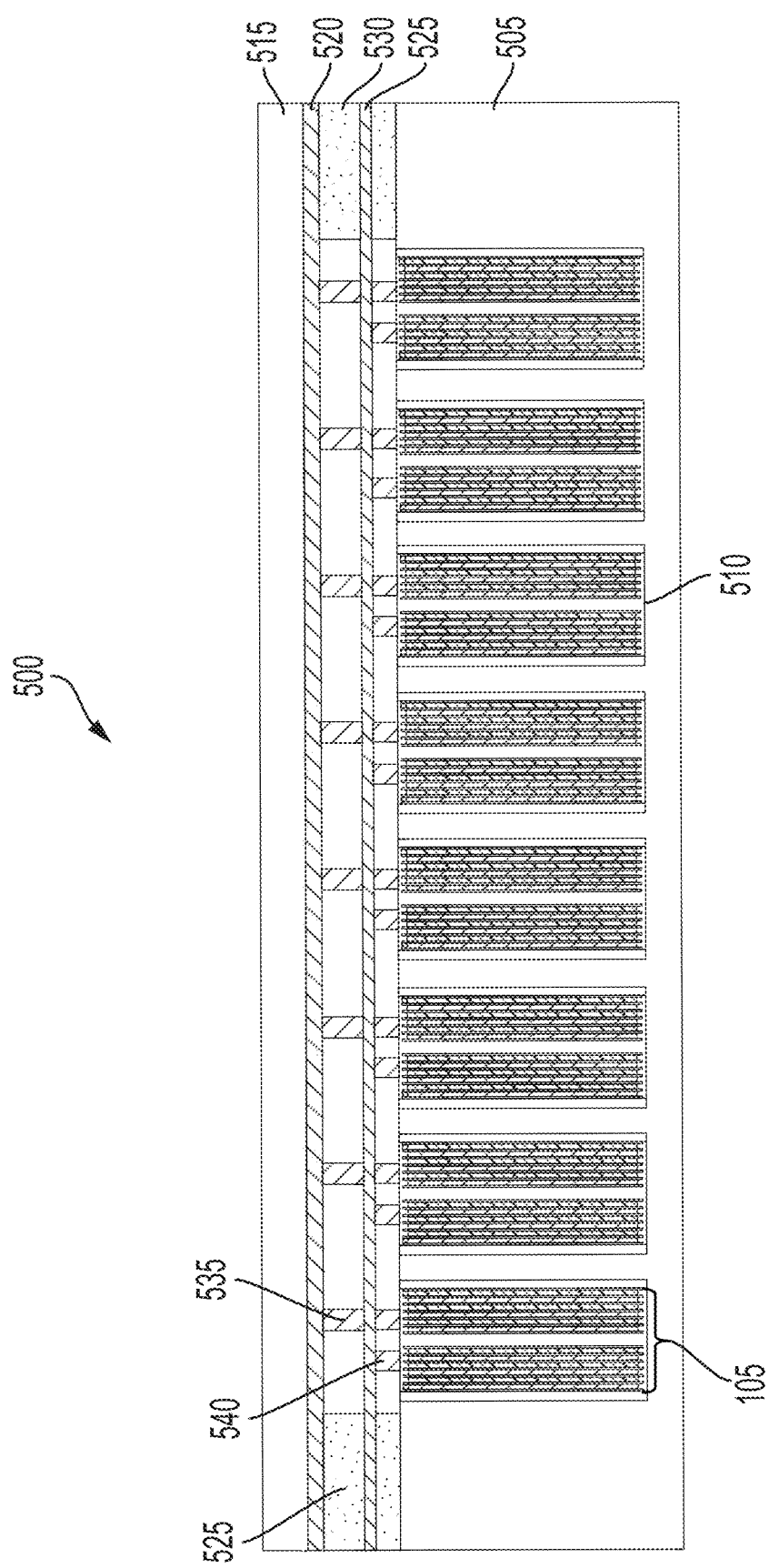
FIG. 5 is a block diagram depicting a cross-sectional view of an example battery module for holding battery cells in an electric vehicle.

FIG. 5 depicts is a cross-section view of a battery or module 500 to hold a plurality of battery cells 105 in an electric vehicle. The battery module 500 can be part of the system or apparatus 100. The battery module 500 can be of any shape. The shape of the battery module 500 can be cylindrical with a circular, elliptical, or ovular base, among others. The shape of the battery module 500 can also be prismatic with a polygonal base, such as a triangle, a square, a rectangle (e.g., as depicted), a pentagon, and a hexagon, among others. The battery module 500 can have a length ranging between 10 cm to 200 cm. The battery module 500 can have a width ranging between 10 cm to 200 cm. The battery module 500 can have a height ranging between 65 mm to 100 cm.

The battery module 500 can include at least one battery case 505 and a capping element 515. The battery case 505 can be separated from the capping element 515. The battery case 505 can include or define a set of holders 510. Each holder 510 can be or include a hollowing or a hollow portion defined by the battery case 505. Each holder 510 can house, contain, store, or hold a battery cell 105. The battery case 505 can include at least one electrically or thermally conductive material, or combinations thereof. The positive terminal 200 and the negative terminal 215 of the battery cell 105 can extend from the battery cell 105 through the respective holder 510 of the battery case 505. The positive bonding element 205 and the negative bonding element 215 of the battery cell 105 can extend from the battery cell 105 through the respective holder 510 of the battery case 505.

Between the battery case 505 and the capping element 515, the battery module 500 can include at least one positive current collector 520, at least one negative current collector 525, and at least one electrically insulative layer 530. The positive current collector 520 and the negative current collector 525 can each include an electrically conductive material to provide electrical power to other electrical components in the electric vehicle. The positive current collector 520 (sometimes referred herein as a positive busbar) can be connected or otherwise electrically coupled with the positive terminal 200 of each battery cell 105 housed in the set of holders 510 via a bonding element 535. One end of the bonding element 535 can be bonded, welded, connected, attached, or otherwise electrically coupled to the positive terminal 200 of the battery cell 105. The negative current collector 525 (sometimes referred herein as a negative busbar) can be connected or otherwise electrically coupled with the negative terminal 215 of each battery cell 105 housed in the set of holders 510 via a bonding element 540. The bonding element 540 can be bonded, welded, connected, attached, or otherwise electrically coupled to the negative terminal 215 of the battery cell 105.

The positive current collector 520 and the negative current collector 525 can be separated from each other by the electrically insulative layer 530. The electrically insulative layer 530 can include spacing to pass or fit the positive bonding element 535 connected to the positive current collector 520 and the negative bonding element 525 connected to the negative current collector 525. The electrically insulative layer 530 can partially or fully span the volume defined by the battery case 505 and the capping element 515. A top plane of the electrically insulative layer 530 can be in contact or be flush with a bottom plane of the capping element 515. A bottom plane of the electrically insulative layer 530 can be in contact or be flush with a top plane of the battery case 505. The electrically insulative layer 530 can include any electrically insulative material or dielectric material, such as air, nitrogen, sulfur hexafluoride ($SF_6$), ceramic, glass, and plastic (e.g., polysiloxane), among others to separate the positive current collector 520 from the negative current collector 525.

Figure 6:
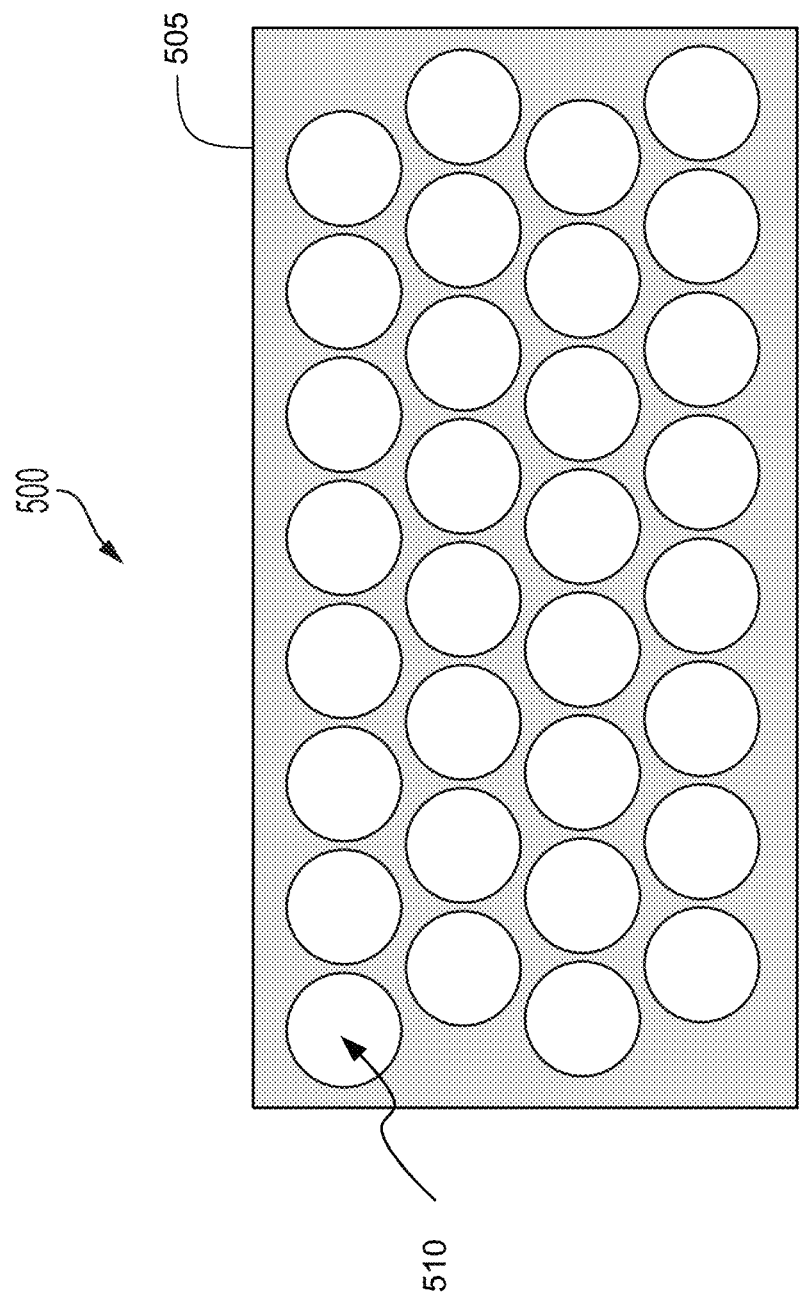
FIG. 6 is a block diagram depicting a top-down view of an example battery pack for holding for battery cells in an electric vehicle.

FIG. 6 depicts a top-down view of a battery module 500 to a hold a plurality of battery cells 105 in an electric vehicle. The battery module 500 can define or include a set of holders 510. The shape of each holder 510 can match a shape of the housing 105 of the battery cell 105. The shape of each holder 510 can be cylindrical with a circular (e.g., as depicted), elliptical, or ovular base, among others. The shape of each holder 510 can also be prismatic with a polygonal base, such as a triangle, a square, a rectangle, a pentagon, and a hexagon, among others. The shapes of each holder 510 can vary or can be uniform throughout the battery module 500. For example, some holders 510 can be hexagonal in shape, whereas other holders can be circular in shape. The dimensions of each holder 510 can be larger than the dimensions of the battery cell 105 housed therein. Each holder 510 can have a length ranging between 10 mm to 300 mm. Each holder 510 can have a width ranging between 10 mm to 300 mm. Each holder 510 can have a height (or depth) ranging between 65 mm to 100 cm.

Figure 7:
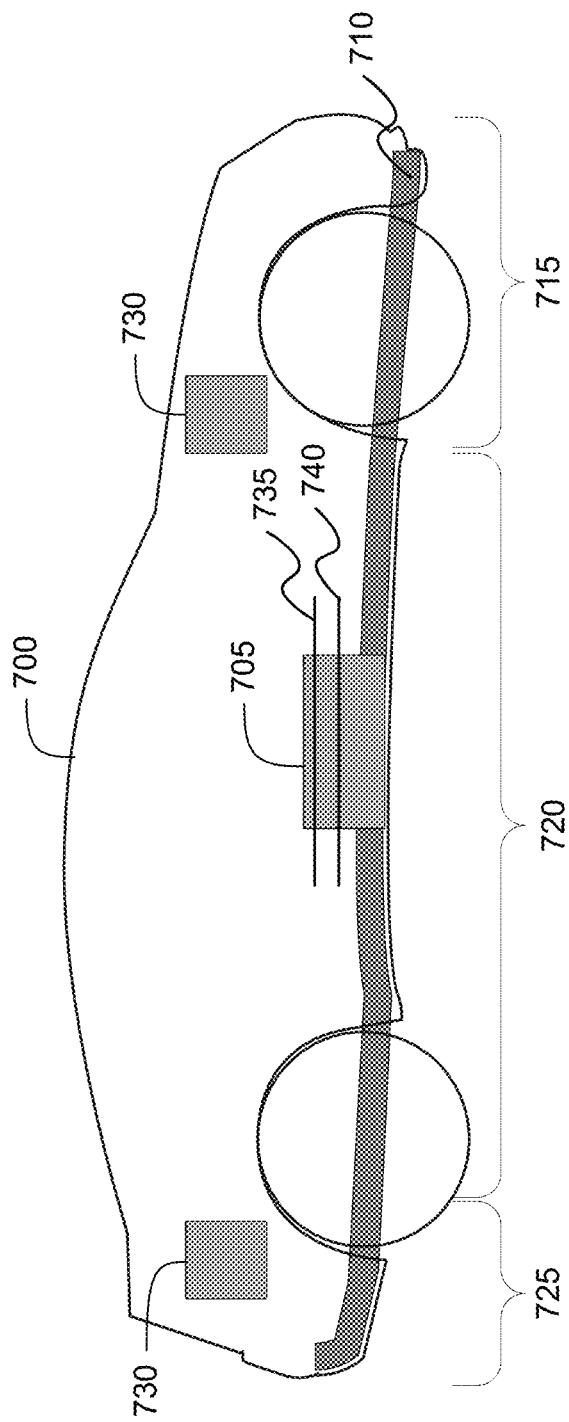
FIG. 7 is a block diagram depicting a cross-sectional view of an example electric vehicle installed with a battery pack.

Referring to FIG. 7, depicted is a cross-section view of an electric vehicle 700 installed with a battery pack 705. The electric vehicle 700 can be an electric automobile (e.g., as depicted), a motorcycle, a scooter, a passenger vehicle, a passenger or commercial truck, and another type of vehicle such as sea or air transport vehicles, a plane, a helicopter, a submarine, a boat, or a drone, among others. The electric vehicle 700 can include at least one battery pack 705. The battery pack 705 can be part of the system or apparatus 100. The battery pack 705 can house, contain, or otherwise include one or more battery modules 500 or a set of battery modules 500 containing one or more battery cells 105. The number of battery modules 500 in the battery pack 705 can range between. The battery pack 705 can be of any shape. The shape of battery pack 705 can be cylindrical with a circular, elliptical, or ovular base, among others. The shape of battery pack 705 can also be prismatic with a polygonal base, such as a triangle, a square, a rectangle (e.g., as depicted), a pentagon, and a hexagon, among others. The battery pack 705 can have a length ranging between 100 cm to 600 cm. The battery pack 705 can have a width ranging between 50 cm to 400 cm. The battery pack 705 can have a height ranging between 70 mm to 800 mm.

The electric vehicle 700 can include at least one chassis 710 (e.g., a frame, internal frame, or support structure). The chassis 710 can support various components of the electric vehicle 700. The chassis 710 can span a front portion 715 (e.g., a hood or bonnet portion), a body portion 720, and a rear portion 725 (e.g., a trunk portion) of the electric vehicle 700. The battery pack 705 can be installed or placed within the electric vehicle 700. The battery pack 705 can be installed on the chassis 710 of the electric vehicle 700 within the front portion 715, the body portion 720 (as depicted in FIG. 7), or the rear portion 725.

The electric vehicle 700 can include one or more components 730. The one or more components 730 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 730 can be installed in the front portion 715, the body portion 720, or the rear portion 725 of the electric vehicle 700. The battery pack 705 installed in the electric vehicle 700 can provide electrical power to the one or more components 730 via at least one positive current collector 735 and at least one negative current collector 740. The positive current collector 735 and the negative current collector 740 can be connected or otherwise be electrically coupled to other electrical components of the electric vehicle 700 to provide electrical power. The positive current collector 735 (sometimes herein referred to as a positive busbar) can be connected or otherwise electrically coupled with each positive current collector 520 of each battery module 500 in the battery pack 705. The negative current collector 740 (sometimes herein referred to as a negative busbar) can be connected or otherwise electrically coupled with each negative current collector 525 of each battery module 500 in the battery pack 705.

Figure 8:
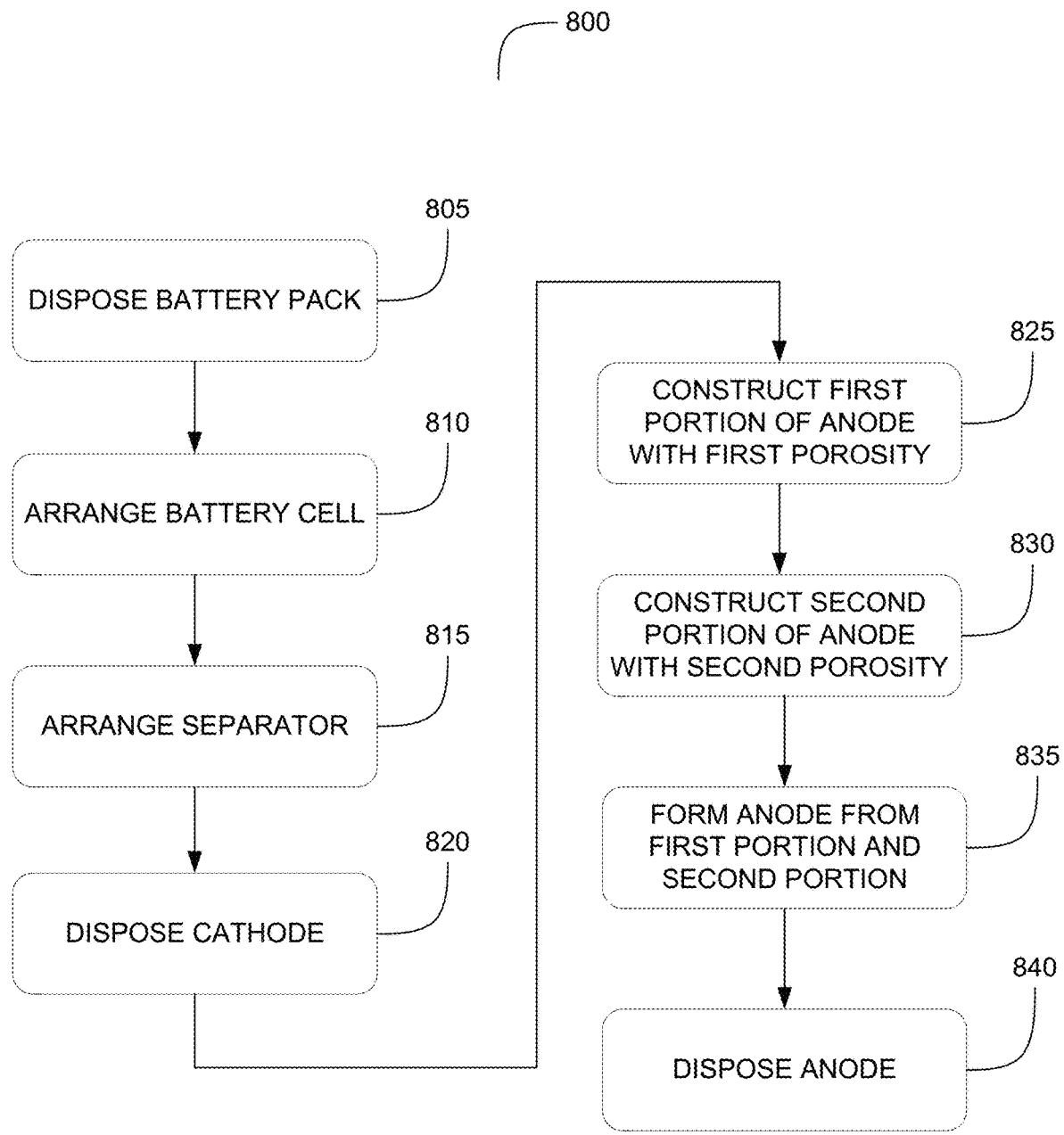
FIG. 8 is a flow diagram depicting an example method of assembling battery cells for battery packs for electric vehicles.

Referring to FIG. 8, depicted is a method 800 of assembling battery cells for battery packs in electric vehicles. The functionalities of the method 800 can be implemented or performed using any of the systems, apparatuses, or battery cells detailed above in conjunction with FIGS. 1-9. At ACT 805, the method 800 can include disposing a battery pack (e.g., battery pack 705). The battery pack can be installed, arranged, or otherwise disposed in an electric vehicle (e.g., electric vehicle 700). The battery pack can house, contain, or include a set of battery modules (e.g., battery modules 500). The battery pack can store electrical power for one or more components of the electric vehicle. The battery pack can provide electrical power to the one or more components via a positive current collector and a negative current collector.

At ACT 810, the method 800 can include arranging a battery cell (e.g., battery cell 105). The battery cell can be a lithium-ion battery cell, or have a non-uniform porosity anode. The battery cell can be stored or contained within a holder of the battery module included in the battery pack. The battery cell can include a housing. The housing can be formed from a cylindrical casing with a circular, ovular, or elliptical base or from a prismatic casing with a polygonal base. The housing can include a top surface, a bottom surface, and a sidewall. The housing can have a cavity to contain contents of the battery cell. The cavity within the housing can be defined by the top surface, the bottom surface, and the sidewall.

At ACT 815, the method 800 can include arranging a separator (e.g., separator 308). The separator can be arranged such that it will separate a cathode layer from an and anode layer. The separator can be formed with polyolefin, which can refer to a class of polymer that is produced from olefin by polymerizing olefin ethylene. Ethylene can come from a petrochemical source. Polyolefin can be made from polyethylene, polypropylene or laminates of both materials. The method 800 can include arranging an electrolyte or electrolyte layer (e.g., electrolyte material 145 or electrolyte 318). The electrolyte can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The electrolyte can be comprised of ceramic electrolyte materials, glassy electrolyte materials, or polymer electrolyte materials, or any combination thereof. The electrolyte can be fed, inserted, or otherwise placed into the cavity of the housing for the battery cell. The electrolyte can at least partially span between the top surface, the bottom surface, and the sidewall of the housing for the battery cell.

At ACT 820, the method 800 can include disposing a cathode layer (e.g., cathode 135 or cathode 310). The cathode can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The cathode can be comprised of liquid or solid cathode materials, such as lithium-based oxide materials or phosphates. The cathode can be placed or inserted into the cavity of the housing for the battery cell. The cathode can be situated at least partially along the first side of the electrolyte. The cathode layer can output conventional electrical current into the battery cell. The cathode layer can be electrically coupled with the positive terminal of the battery cell.

At ACT 825, the method 800 can include constructing a first portion (e.g., 314) of an anode layer (e.g., anode 312 or anode 140) with a first porosity. At ACT 830, the method 800 can include constructing a second portion (e.g., 316) of an anode layer (e.g., anode 312 or anode 140) with a first porosity. The first and second portions of the anode can be formed or synthesized. The first and second portions of the anode can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)).

The first and second portions of the anode can be formed using a two-step or multi-step coating-drying process, such as a two-step CVD, ALD, MBE, or PVD. For example, during one of the steps, a first portion can be formed with a first porosity, and during a different step, a second portion can be formed with a second porosity that is different from the first porosity. The two or more portions of the anode can be formed to establish or construct a hierarchical structure for the anode that includes portions with varying or increasing porosity from the negative correct collector end towards the separator end (or decreasing porosity from the separator end towards the negative current collector or terminal end). In some cases, the porosity of the portion of the anode closest to the separator can be increased by transferring carbon additives from the separator or cathode to the first portion of the anode, thereby increasing the number of pores at the first portion relative to a remaining portion of the anode. Transferring carbon additives to the first portion can reduce the resistance at the first portion, thereby reducing the rate of lithium plating at the first portion.

At ACT 835, the method 800 can include forming the anode from the first portion and the second portions formed at ACT 825 and ACT 830, respectively. The anode can be formed from multiple portions. The anode can be formed using a two-step or multi-step coating-drying process, such as a two-step CVD, ALD, MBE, or PVD. The anode can be constructed to have a varying porosity from an end of the anode that is closer to the separator arranged between the anode and the cathode relative to an end of the anode closer to the negative terminal or negative current collector.

At ACT 840, the method 800 can include disposing the anode (e.g., anode 312 or anode layer 114). The two or more portions with different porosities can be part of the anode layer of the battery cell. The anode layer can be placed or inserted into the cavity of the housing for the battery cell. The anode layer can be situated at least partially along the second side of the electrolyte layer. The anode layer can receive conventional electrical current into the battery cell. The anode layer can be electrically coupled with the negative terminal of the battery cell. The portions of the anode layer can bond or interface with the electrolyte layer to form an electrically conductive path through the anode layer. The anode layer can be initially free of any lithium material, prior to the first charging cycle of the battery cell. During the charging cycle of the battery cell, the lithium material can be transferred through the electrolyte layer via the second side. The portion of the anode layer more susceptible to lithium plating can be configured with an increased porosity to reduce the internal resistance, and thereby reduce the rate of lithium plating or amount of lithium plating, thereby reducing the degradation of the battery cell during high charge rates (e.g., fast full or 80% charge rate of 1 hour as compared to a full or 80% charge rate of 3 hours). For example, fast charging can result in an increased amount of dead or unrecyclable or non-reversible lithium plating, so the lithium or lithium ions cannot be reused.

Figure 9:
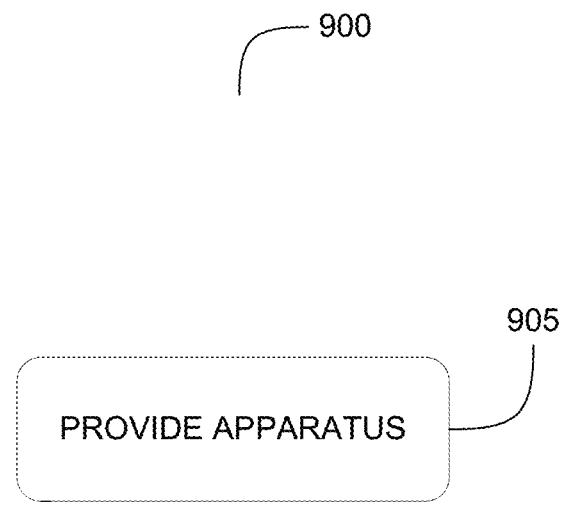
FIG. 9 is a flow diagram depicting an example of method of providing battery cells for battery packs for electric vehicles.

Referring to FIG. 9, depicted is a method 900 of providing battery cells for battery packs in electric vehicles. The functionalities of the method 900 can be implemented or performed using any of the systems, apparatuses, or battery cells detailed above in conjunction with FIGS. 1-8. The method 900 can include providing an apparatus 100 (ACT 905). The apparatus 100 can be installed in an electric vehicle 700. The apparatus 100 can include a battery pack 705 disposed in the electric vehicle 700 to power one or more components 730 of the electric vehicle 700. The battery pack 705 can include one or more battery modules 500. The apparatus 100 can include a set of battery cells 105. Each battery cell 105 can be arranged in the battery module 500. The battery cell 105 can include a housing. The housing can include a top surface, a bottom surface, and a sidewall. The top surface, the bottom surface, and the sidewall can define a cavity.

Within the cavity defined by the housing, the battery cell can have an electrolyte layer. The electrolyte layer can have a first side and a second side, and can transfer ions between the first side and the second side 235. The battery cell can have a cathode layer disposed within the cavity of the housing. The cathode layer can be situated along the first side of the electrolyte layer. The cathode layer can be electrically coupled with the positive terminal. The battery cell can have an anode layer disposed within the cavity 130 of the housing. The anode layer can be situated along the second side of the electrolyte material 145, and can be separated from the cathode layer by the electrolyte layer or a separator. The anode layer can be electrically coupled with the negative terminal. The anode layer can have portions with varying porosity, such as a first portion closer to the separator with a greater porosity than a second portion closer to the negative terminal.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus to store electrical energy for electric vehicles, comprising:
   a battery pack disposed in an electric vehicle to power the electric vehicle; and
   a battery cell arranged in the battery pack, the battery cell having a housing that defines a cavity within the housing of the battery cell, the battery cell having:
   a separator having a first side and a second side to transfer ions between the first side and the second side, the separator arranged within the cavity;
   a cathode disposed within the cavity along the first side of the separator, the cathode electrically coupled with a positive terminal; and
   an anode disposed within the cavity along the second side of the separator and separated from the cathode by the separator, the anode electrically coupled with a negative terminal, the anode comprising:
   a first portion adjacent to the second side of the separator;
   a second portion adjacent to the first portion and separated from the separator by the first portion, wherein a porosity of the first portion of the anode is greater than a porosity of the second portion of the anode and is determined via a model-based anode configuration; and
   the model-based anode configuration wherein a model is programmed to:
   receive input comprising a thickness of the separator, a thickness of the cathode, a thickness of the anode for disposition along the second side of the separator, a type of material used in the battery cell, and a rate of charge;
   determine, responsive to the input, a lithium plating amount and a lithium plating location in the anode; and
   determine, based on the lithium plating amount and the lithium plating location in the anode, the porosity for the first portion of the anode to reduce an amount of lithium plating on the second side of the separator relative to battery cells having uniform porosity.

2. The apparatus of claim 1, comprising:
   the porosity of the first portion of the anode predetermined based on the model, wherein the input of the model further comprises a current amount, and the output of the model further comprises at least one of an amount of heat generation, or an average temperature of the battery cell.

3. The apparatus of claim 1, comprising:
   the second portion adjacent to the negative terminal and the first portion.

4. The apparatus of claim 1, comprising
   a third portion adjacent to the second portion and the negative terminal, the third portion having a different porosity than the first portion of the anode and the second portion of the anode.

5. The apparatus of claim 1, comprising:
   the porosity of the first portion of the anode greater than the porosity of the second portion by a predetermined threshold.

6. The apparatus of claim 1, comprising:
   the porosity of the first portion of the anode greater than the porosity of the second portion by at least 15%.

7. The apparatus of claim 1, comprising:
   the porosity of the first portion of the anode greater than the porosity of the second portion by an amount within a range of 18% to 30%.

8. The apparatus of claim 1, comprising:
   a thickness of the first portion of the anode less than a thickness of the second portion of the anode.

9. The apparatus of claim 1, comprising:
   a thickness of the first portion of the anode less than 40% of a thickness of the second portion of the anode.

10. The apparatus of claim 1, comprising:
    a thickness of the first portion of the anode less than 30 microns.

11. The apparatus of claim 1, wherein the first portion of the anode and the second portion of the anode are manufactured via a two-step coating-drying to provide the porosity of the first portion of the anode greater than the porosity of the second portion of the anode.

12. The apparatus of claim 1, wherein the anode comprises a hierarchical structure comprising the first portion of the anode and the second portion of the anode.

13. The apparatus of claim 1, wherein the porosity of the first portion of the anode is increased via movement of carbon additives from the separator to the first portion of the anode.

14. A method of providing battery cells to power electric vehicles, comprising:
    disposing a battery pack in an electric vehicle to power the electric vehicle;
    arranging a housing for a battery cell in the battery pack, the housing defining a cavity within the housing for the battery cell;
    arranging, within the cavity of the battery cell, a separator having a first side and a second side to transfer ions between the first side and the second side;
    disposing, within the cavity of the battery cell, a cathode along the first side of the separator, the cathode electrically coupled with a positive terminal;
    providing input to a model for the battery cell comprising a thickness of the separator, a thickness of the cathode, a thickness of an anode for disposition along the second side of the separator, a type of material used in the battery cell, and a rate of charge;

receiving, responsive to the input to the model, output from the model comprising a lithium plating amount and a lithium plating location in the anode;

determining, based on the output from the model, a porosity for a plurality of portions of the anode to reduce an amount of lithium plating on the second side of the separator relative to battery cells having uniform porosity; and disposing, within the cavity, the anode along the second side of the separator, the anode electrically coupled with a negative terminal, the plurality of portions of the anode comprising:
- a first portion adjacent to the second side of the separator; and
- a second portion adjacent to the first portion and separated from the separator by the first portion, wherein a porosity of the first portion of the anode is greater than a porosity of the second portion of the anode based on the porosity of the plurality of portions of the anode determined via the model.

15. The method of claim 14, further comprising:

inputting, into the model, a current amount;

determining, based on the model, an amount of heat generation, or an average temperature of the battery cell; and establishing the porosity of the first portion based on the amount of heat generation, or the average temperature of the battery cell determined from the model.

16. The method of claim 14, further comprising:

creating the first portion of the anode and the second portion of the anode via a two-step coating-drying process to provide the porosity of the first portion of the anode greater than the porosity of the second portion of the anode.

17. The method of claim 14, wherein the second portion is adjacent to the negative terminal and the first portion.

18. The method of claim 14, wherein the plurality of portions of the anode comprises a third portion that is adjacent to the second portion and the negative terminal, the third portion having a different porosity than the first portion of the anode and the second portion of the anode.

19. The method of claim 14, wherein the porosity of the first portion of the anode is greater than the porosity of the second portion by at least 15%.

20. An electric vehicle, comprising:

one or more components;

a battery pack to power the one or more components; and a battery cell arranged in the battery pack, the battery cell having a housing that defines a cavity within the housing of the battery cell, the battery cell having:

a separator having a first side and a second side to transfer ions between the first side and the second side, the separator arranged within the cavity;

a cathode disposed within the cavity along the first side of the separator, the cathode electrically coupled with a positive terminal; and an anode disposed within the cavity along the second side of the separator and separated from the cathode by the separator, the anode electrically coupled with a negative terminal, the anode comprising:

a first portion adjacent to the second side of the separator;

a second portion adjacent to the first portion and separated from the separator by the first portion, wherein a porosity of the first portion of the anode is greater than a porosity of the second portion of the anode and is determined via a model-based anode configuration; and the model-based anode configuration wherein a model is programmed to:

receive input comprising a thickness of the separator, a thickness of the cathode, a thickness of the anode for disposition along the second side of the separator, a type of material used in the battery cell, and a rate of charge;

determine, responsive to the input, a lithium plating amount and a lithium plating location in the anode; and determine, based on the lithium plating amount and the lithium plating location in the anode, the porosity for the first portion of the anode to reduce an amount of lithium plating on the second side of the separator relative to battery cells having uniform porosity.

\* \* \* \* \*